(12) United States Patent
Ivanisov et al.

(10) Patent No.: US 9,285,569 B2
(45) Date of Patent: Mar. 15, 2016

(54) LENS ASSEMBLY FOR OPTICAL IMAGING

(71) Applicant: DELTA ID INC., Fremont, CA (US)

(72) Inventors: Alexander Ivanisov, Newark, CA (US); Eduard Trygubov, Lakewood, CO (US)

(73) Assignee: Delta ID Inc., Fremont, CA (US)

( * ) Notice: Subject to any disclaimer, the term of this patent is extended or adjusted under 35 U.S.C. 154(b) by 137 days.

(21) Appl. No.: 14/258,575

(22) Filed: Apr. 22, 2014

(65) Prior Publication Data

US 2015/0301318 A1    Oct. 22, 2015

(51) Int. Cl.
| | | |
|---|---|---|
| *G02B 3/02* | (2006.01) | |
| *G02B 13/18* | (2006.01) | |
| *G02B 9/10* | (2006.01) | |
| *H04N 5/225* | (2006.01) | |

(52) U.S. Cl.
CPC ........ *G02B 13/18* (2013.01); *G02B 9/10* (2013.01); *H04N 5/2254* (2013.01)

(58) Field of Classification Search
CPC ................................. G02B 13/18; G02B 19/10

USPC .................................................. 359/642–830
See application file for complete search history.

(56) References Cited

U.S. PATENT DOCUMENTS

| | | | |
|---|---|---|---|
| 5,327,291 | A | 7/1994 | Baker et al. |
| 7,236,315 | B2 | 6/2007 | Chen et al. |
| 2004/0223235 | A1 | 11/2004 | Ning |
| 2011/0134545 | A1 | 6/2011 | Lin et al. |

*Primary Examiner* — Mahidere Sahle
(74) *Attorney, Agent, or Firm* — Hoffmann & Baron, LLP (57) ABSTRACT

The invention provides an optical imaging lens assembly comprising, in order from an object-side to an image side, a first aspherical positive lens element and a second aspherical negative lens element, each comprising an object-side surface and an image-side surface. Elements of the optical imaging lens assembly may be configured to satisfy the relations (i) $T<1.2\ f$, (ii) $1.1<f/f1<1.5$, (iii) $-1.5<f/f2<-0.6$, (iv) $0.2<R1/f<0.5$, and (v) $-0.25<K1<-0.05$, wherein f is focal length of the lens assembly, f1 is focal length of the first lens element, f2 is focal length of the second lens element, R1 is radius of curvature on the object-side surface of the first lens element, K1 is conic of the object-side surface of the first lens element, and T is total track length of the optical lens.

11 Claims, 12 Drawing Sheets

FIG 1A

| Surface | System element | Radius, and surface type (mm) | Thickness (mm) | Material (following the surface when considered from object-side to image-side) | Refractive index | Diameter of clear aperture (mm) | Optical power (mm$^{-1}$) |
|---|---|---|---|---|---|---|---|
| Not shown | Object | Plano | 200.0* | | | 120 | |
| 112,130 | Lens 1 (Object-side surface) | 1.2966 Aspheric | 0.45 | Acrylic | 1.4852 | 1.68 | 0.3122 |
| 114 | Lens 1 (Image-side surface) | 6.9396 Aspheric | 1.8215 | | | 1.65 | |
| 116 | Lens 2 (Object-side surface) | Infinite Aspheric | 0.35 | Polycarbonate | 1.5723 | 1.49 | -.2195 |
| 118 | Lens 2 (Image-side surface) | Infinite Aspheric | 1.049 | | | 1.93 | |
| 140 | Image | Plano | | | | 2.47 | |

*Calculated as distance along the optical axis between the object plane and the next surface i.e. lens surface 112.*

FIG 1B

| Surface | Conic cons. (K) | $A_1$ | $A_2$ | $A_3$ | $A_4$ | $A_5$ | $A_6$ |
|---|---|---|---|---|---|---|---|
| 112 | -0.185470 | 0 | -0.006168 | 0 | 0 | 0 | 0 |
| 114 | 22.41182 | 0 | 0 | 0 | 0 | 0 | 0 |
| 116 | 0 | -0.006296 | -0.598644 | -0.256750 | 0.0782649 | -1.917818 | 0 |
| 118 | 0 | 0.185245 | -0.526682 | 0.320191 | -0.322321 | 0.096976 | 0 |

| Surface | System element | Radius, and surface type (mm) | Thickness (mm) | Material (following the surface when considered from object-side to image-side) | Refractive index | Diameter of clear aperture (mm) | Optical power (mm$^{-1}$) |
|---|---|---|---|---|---|---|---|
| Not shown | Object | Plano | 200.0* | | | 120 | |
| 212 | Lens 1 (Object-side surface) | 1.300 Aspheric | 0.8103 | Acrylic | 1.4852 | 2.48 | 0.3334 |
| 214 | Lens 1 (Image-side surface) | 9.712 Aspheric | 0.7218 | | | 2.30 | |
| 230 | STOP | | 0.9548 | | | | |
| 216 | Lens 2 (Object-side surface) | High order aspheric | 0.5014 | Polycarbonate | 1.5723 | 1.21 | -.3150 |
| 218 | Lens 2 (Image-side surface) | High order aspheric | 0.718 | | | 1.72 | |
| 240 | Image surface | Plano | .70 | | | 2.07 | |
| Not shown (Coincident with image surface) | Image | Plano | | | | | |

* Calculated as distance along the optical axis between the object plane and the next surface i.e. lens surface 212.

FIG 2B

| Surface | Conic cons. (K) | $A_1$ | $A_2$ | $A_3$ | $A_4$ | $A_5$ | $A_6$ |
|---|---|---|---|---|---|---|---|
| 212 | -0.391379 | 0 | 0.0008163 | 0 | 0 | 0 | 0 |
| 214 | 13.28905 | 0 | 0 | 0 | 0 | 0 | |
| 216 | 0 | -0.347304 | -0.652336 | 0.108443 | -0.386542 | -2.032448 | -1.05745 |
| 218 | 0 | -0.063956 | -0.440219 | 0.329487 | -0.379745 | 0.126827 | -0.01691 |

| Surface | System element | Radius, and surface type (mm) | Thickness (mm) | Material (following the surface when considered from object-side to image-side) | Refractive index | Diameter of clear aperture (mm) | Optical power (mm$^{-1}$) |
|---|---|---|---|---|---|---|---|
| Not shown | Object | Plano | 200.0* | | | 120 | |
| 312, 330 | Lens 1 (Object-side surface) | 1.1348 Aspheric | 0.4925 | Acrylic | 1.4852 | 1.73 | 0.3404 |
| 314 | Lens 1 (Image-side surface) | 4.7781 Aspheric | 1.4345 | | | 1.67 | |
| 316 | Lens 2 (Object-side surface) | Infinite Aspheric | 0.5344 | Polycarbonate | 1.5723 | 1.36 | -.2453 |
| 318 | Lens 2 (Image-side surface) | Infinite Aspheric | 0.3 | | | 1.87 | |
| 352 | IR filter (Object-side surface) | Plano | 0.31 | Glass(BK7) | 1.5105 | 2.20 | 0 |
| 354 | IR filter (Image-side surface) | Plano | 0.70 | | | 2.20 | |
| 340 | Image surface | Plano | | | | 2.47 | |

*Calculated as distance along the optical axis between the object plane and the next surface i.e. lens surface 312.*

FIG 3B

| Surface | Conic cons. (K) | $A_1$ | $A_2$ | $A_3$ | $A_4$ | $A_5$ | $A_6$ |
|---|---|---|---|---|---|---|---|
| 312 | -0.165097 | 0 | -0.007304 | 0 | 0 | 0 | 0 |
| 314 | 10.71508 | 0 | 0 | 0 | 0 | 0 | |
| 316 | 0 | -0.203553 | -0.420607 | -0.810816 | 1.763135 | -3.434888 | 0 |
| 318 | 0 | 0.009969 | -0.303933 | 0.129737 | -0.160261 | 0.063417 | 0 |

| Surface | System element | Radius, and surface type (mm) | Thickness (mm) | Material (following the surface when considered from object-side to image-side) | Refractive index | Diameter of clear aperture (mm) | Optical power (mm$^{-1}$) |
|---|---|---|---|---|---|---|---|
| Not shown | Object | Plano | 200.0* | | | 120 | |
| 412, 430 | Lens 1 (Object-side surface) | 1.2978 Aspheric | 0.45 | Acrylic | 1.4852 | 1.68 | 0.3103 |
| 414 | Lens 1 (Image-side surface) | 6.7667 Aspheric | 1.8215 | | | 1.65 | |
| 416 | Lens 2 (Object-side surface) | Infinite Aspheric | 0.35 | Acrylic | 1.4852 | 1.49 | -.2132 |
| 418 | Lens 2 (Image-side surface) | Infinite Aspheric | 1.0492 | | | 1.93 | |
| 440 | Image | Plano | | | | 2.48 | |

*Calculated as distance along the optical axis between the object plane and the next surface i.e. lens surface 412.*

FIG 4B

| Surface | Conic cons. (K) | $A_1$ | $A_2$ | $A_3$ | $A_4$ | $A_5$ | $A_6$ |
|---|---|---|---|---|---|---|---|
| 412 | -0.137953 | 0 | -0.007947 | 0 | 0 | 0 | 0 |
| 414 | 25.09351 | 0 | 0 | 0 | 0 | 0 | 0 |
| 416 | 0 | -0.001226 | -0.697134 | -0.063084 | 0.316240 | -1.508449 | 0 |
| 418 | 0 | 0.218391 | -0.583878 | 0.377297 | -0.375452 | 0.125359 | 0 |

LENS ASSEMBLY FOR OPTICAL IMAGING

FIELD OF THE INVENTION

The invention relates to an optical lens assembly for imaging, and an optical imaging apparatus. More particularly, the invention provides a compact lens assembly for optical imaging, with applications in portable imaging devices or portable electronic devices.

BACKGROUND

Development of compact electronic devices having optical imaging capabilities has necessitated corresponding developments in compact imaging lens assemblies. While high resolution compact optical imaging lens assemblies are known, such assemblies include a large number of lens elements—thereby increasing the total track length of the optical lens assembly, with attendant consequences for size of the devices. Additionally, prior art assemblies generally rely on spherical-surface glass lenses as optical elements, including where two spherical glass lenses may be adhered together to form a doublet to correct chromatic aberration. These prior art arrangements result in complicated and/or relatively expensive manufacturing requirements.

There is accordingly a requirement for optical imaging lens assemblies that work in a relatively narrow spectral range and that achieve a reduction in size and enable manufacturing efficiencies, while maintaining image quality.

SUMMARY OF THE INVENTION

The invention relates to an optical lens assembly for imaging, and an optical imaging apparatus.

The invention provides an optical imaging lens assembly comprising, in order from an object-side to an image side, a first aspherical positive lens element comprising an object-side surface and an image-side surface, a second aspherical negative lens element comprising an object-side surface and an image-side surface.

For the purposes of the invention, f is focal length of the optical imaging lens assembly, f1 is focal length of the first lens element, f2 is focal length of the second lens element, R1 is radius of curvature on the object-side surface of the first lens element, K1 is conic of the object-side surface of the first lens element, T1 is thickness of the first lens element, T2 is distance between the image-side surface of the first lens element and the object-side surface of the second lens element, T3 is thickness of the second lens element, T4 is distance between the image-side surface of the second lens element and an image surface, and T is total track length of the optical lens assembly such that $T=T1+T2+T3+T4$.

T1, T2, T3 and T4 are distances measured between points of intersection of respective lens surfaces and optical axis of the optical lens assembly. R2 is the radius of curvature on the image-side surface of the first lens element, K2 is conic of the image-side surface of the first lens element, and Ta is total thickness of the optical lens assembly, such that $Ta=T1+T2+T3$.

Elements of the optical imaging lens assembly may be configured to satisfy the relations:
$T<1.2 \, f$;
$1.1<f/f1<1.5$;
$-1.5<f/f2<-0.6$;
$0.2<R1/f<0.5$; and
$-0.25<K1<-0.05$.

Elements of the optical imaging lens assembly may be further configured to satisfy one or more of the following relations:
$0.4<Ta/f<0.8$;
$0.5<R2/f<100$; and
$2.5<K2<50$.

The optical imaging lens assembly may additionally comprise an aperture stop disposed between an object plane and an imaging surface. In embodiments of the invention, the aperture stop may be disposed between the object plane and the first lens element, or on the object-side surface of the first lens element, or on the image-side surface of the first lens element, or between the first and the second lens elements, or within the first lens element.

The optical imaging lens assembly may comprise at least one plano-parallel lens element disposed between the first lens element and the object plane, or between the first lens element and the second lens element, or between the second lens element and the image surface.

The invention additionally provides an optical imaging apparatus comprising an image sensor, and an optical imaging lens assembly. The optical imaging lens assembly comprises, in order from an object-side to an image side, a first aspherical positive lens element comprising an object-side surface and an image-side surface, and a second aspherical negative lens element comprising an object-side surface and an image-side surface.

Elements of the optical imaging lens assembly within the optical imaging apparatus may be configured to satisfy the relations:
$T<1.2 \, f$;
$<f/f1<1.5$;
$-1.5<f/f2<-0.6$;
$0.2<R1/f<0.5$; and
$-0.25<K1<-0.05$.

In an embodiment, elements of the optical imaging lens assembly within the optical imaging apparatus may be further configured to satisfy one or more of the following relations:
$0.4<Ta/f<0.8$;
$0.5<R2/f<100$; and
$2.5<K2<50$.

The optical imaging apparatus may also include an illumination source configured for illuminating an object plane, for image capture. The illumination source may comprise one or more light emitting diodes configured to emit wavelengths within a spectral bandwidth of upto 160 nm within the near infra red spectrum. In a particular embodiment of the optical imaging apparatus, the spectral bandwidth includes wavelengths of 800 nm.

In an embodiment of the optical imaging apparatus, the illumination source may comprise first and second single peak wavelength light emitting diodes, wherein the first light emitting diode emits wavelengths within a first spectral bandwidth that includes wavelengths of 760 nm and the second light emitting diode emits wavelengths within a second spectral bandwidth that includes wavelengths of 850 nm.

DETAILED DESCRIPTION OF THE INVENTION

The present invention comprises an optical lens assembly for imaging, having a reduced number of optical elements, one or more of which optical elements may optionally be plastic.

The optical lens assembly of the present invention comprises two optical lens elements. The optical lens assembly comprises, in order from the object side to the image side, (i) a first aspherical positive lens element comprising a positive meniscus lens (i.e. a meniscus lens that is thicker at the center than at the periphery) having a convex object-side surface and a concave image-side surface, and (ii) a second aspherical negative lens element.

The optical lens assembly may additionally include an aperture stop placed: (i) between the object and the first lens element, (ii) on the object-side surface of the first lens element, (iii) on the image-side surface of the first lens element, (iv) between the first and the second lens elements, or (v) inside the first lens element.

Optical lens assemblies in accordance with the present invention may be understood in terms of the below parameters. Focal length of the optical assembly is f. Focal length of the first lens element is f1. Focal length of the second lens element is f2. Radius of curvature on the object-side surface of the first lens element is R1. The conic (i.e. conic constant) of the object-side surface of the first lens element is K1. Radius of curvature on the image-side surface of the first lens element is R2. The conic of the image-side surface of the first lens element is K2. Thickness of the first lens element at the optical axis of the optical lens assembly is T1. The distance between the image-side surface of the first lens element and the object-side surface of the second lens element along the optical axis of the optical lens assembly is T2. Thickness of the second lens element at the optical axis of the optical lens assembly is T3. The distance between the image-side surface of the second lense element and the image surface is T4. The total thickness of the optical lens assembly along the optical axis of the lens assembly is Ta, wherein Ta=T1+T2+T3. The total track length of the optical lens assembly (i.e. total distance between the object-side surface of the first lens element and the image surface), is T, wherein T=T1+T2+T3+T4). It would be understood that all distances discussed above are distances measured between points of intersection of lens surfaces with the optical axis of the optical lens assembly.

The optical lens assembly of the present invention may be configured to satisfy the following constraints:

T<1.2 f; ... Constraint 1
$1.1<f/f1<1.5$; ... Constraint 2
$-1.5<f/f2<-0.6$; ... Constraint 3
$0.2<R1/f<0.5$; ... Constraint 4
$-0.25<K1<-0.05$ .... Constraint 5

The lens assembly according to embodiments of the present invention is capable of being configured for imaging onto an image sensor, an object located a finite distance away from the object-side surface of the first lens element, or alternatively an object located at optical infinity.

It has been found that configuring a lens assembly in accordance with the above constraints provides a compact and effective optical lens assembly capable of being manufactured using conventional and cost effective injection-molding lens manufacturing techniques.

Additionally, an optical lens assembly configured in accordance with the present invention is found to achieve:

Diffraction limited image quality for apertures (i.e. input pupil diameters) having a focal number of F/2.4 or less, and an angular field of view in the object space of at least upto 40 degrees;

Modulation transfer function MTF>60% at 110 lp/mm (line pairs/millimeter), when f=4 mm Low geometrical distortion, at less than 3%;

Chromatic correction sufficient for image capture under illumination from a single peak LED (within the near infra red (IR), visible or ultra violet spectrums). The achieved chromatic correction is generally sufficient for image capture under illumination with a spectral bandwidth in the region of 160 nanometers (nm) or less within the near infra red (near IR) spectrum.

The optical lens assembly of the present invention may additionally be configured to satisfy on or more of the following constraints:

$0.4<Ta/f<0.8$; ... Constraint 6
$0.5<R2/f<100$; ... Constraint 7
$2.5<K2<50$ .... Constraint 8

Configuring an optical lens assembly of the present invention to satisfy the above constraints 2, 3 and 6, achieves reduction of total track length T of the optical lens assembly, preferably below the effective focal length f. Configuring the optical lens assembly to satisfy constraints 4 and 5 ensures that the first lens element provides sufficient refractive power for the imaging system while preventing chromatic aberration from becoming too large. Configuring the optical lens assembly to satisfy constraints 10 and 11 ensures that the first lens element reduces astigmatism to an extent where that it can be further corrected by the second element, thereby improving correction of field curvature and distortion by the second lens element.

The refractive indexes of the first lens element and the second lens element may be respectively selected such that the first element has a lower refractive index than the second lens element. In an embodiment of the invention, this may be achieved by manufacturing the first lens element from polymethylmethacrylate (PMMA) or cyclo-olefin copolymer (COC), and/or by manufacturing the second lens element from polycarbonate (PC) or polystyrene (PS). In an embodiment, both lens elements may be made off the same material (for example PMMA).

In an embodiment, the optical lens assembly of the present invention may include one or more plano-parallel optical elements (including without limitation, optical windows or optical filters). The one or more plano-parallel elements may be located (i) between the first lens element and an object intended for imaging (ii) between the first lens element and the second lens element or (iii) between the second lens element and the image sensor. The one or more plano-parallel elements may be mounted as part of the optical lens assembly, or to a lens holder, or as part of the image sensor packaging.

Optical lens assemblies configured in accordance with the present invention have a low sensitivity to selection of materials for the lens elements, and permit use of most optical plastics as well as other optical materials such as optical glass.

For the purposes of the invention, aspheric surface profiles of the first and second lens elements within the optical lens assembly may be defined by expression (1) below:

$$z(r) = \frac{cr^2}{1+\sqrt{1-(1+K)c^2r^2}} + A_1r^2 + A_2r^4 + A_3r^6 + A_4r^8 + A_5r^{10} + A_6r^{12} \quad \text{(Expresion (1))}$$

where,
the optical axis is presumed to lie in the z direction;
z(r) is the surface sag at radial co-ordinate r on the surface, (i.e. the z-component of the displacement of the surface from the vertex, at a distance r from the axis);
c is the curvature of the surface $$\left(\text{i.e.} \frac{1}{\text{surface radius}}\right);$$

K is the conic constant; and
The coefficients A, describe the deviation of the surface from the axially symmetric quadric surface specified by c.

It would however be understood that aspheric profiles of the lens elements may be expressed by other appropriate expressions.

Specific embodiments of the present invention are described in the following paragraphs with reference to the accompanying drawings.

Figure 1A:
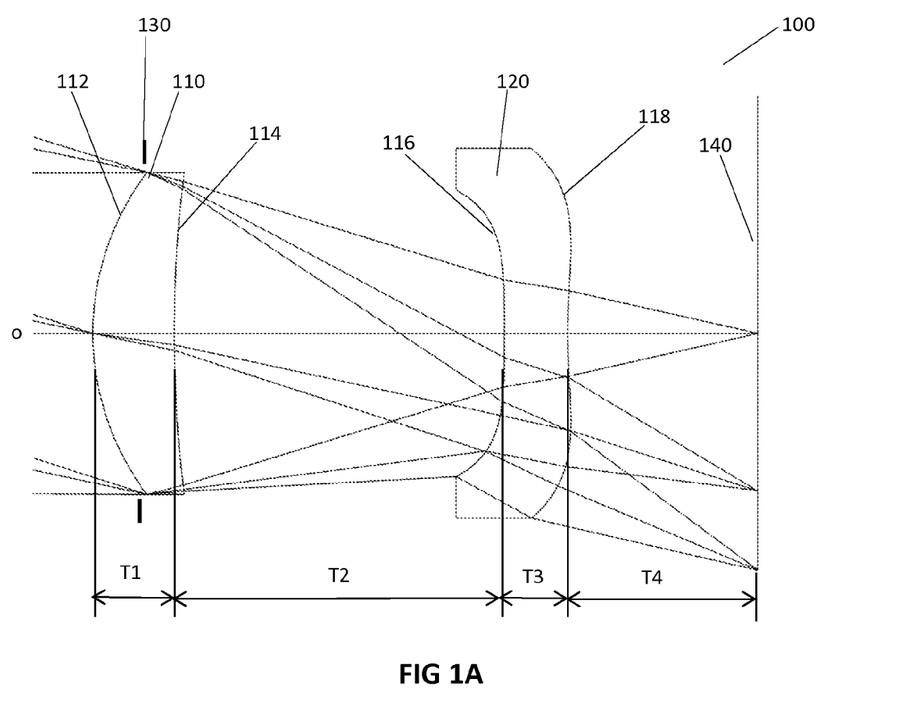
FIG. 1A illustrates an optical assembly in accordance with a first embodiment of the invention.

FIG. 1A illustrates an optical lens assembly 100 in accordance with a first embodiment of the present invention. The optical lens assembly 100 comprises two lens elements, in order from the object side to the image side: a first plastic lens element 110 having a first refractive index, a second plastic lens element 120 having a second refractive index, and an aperture stop 130 disposed on the object-side surface of the first lens element. First lens element 110 comprises a positive meniscus lens having a convex object-side surface 112 and a concave image-side surface 114. Second lens element 120 comprises a negative lens element, having a aspherical object-side surface 116 and an aspherical image-side surface 118. In the illustrated embodiment, second lens element 120 has a negative optical power, and the first refractive index is lower than the second refractive index.

Thickness of first lens element 110 at optical axis o of optical lens assembly 100 is T1. The distance between the image-side surface 114 of the first lens element 110 and the object-side surface 116 of the second lens element 120 along the optical axis o is T2. Thickness of the second lens element 120 at the optical axis o is T3. The distance between image-side surface of second lens element and an image surface 140 is T4. The total thickness of the optical lens assembly along the optical axis o is Ta (i.e. T1+T2+T3). The total distance between the object-side surface of the first lens element 110 and the image surface 140, measured along the optical axis o is T (i.e. T1+T2+T3+T4). It would be understood that while image surface 140 is illustrated in FIG. 1A, it may not necessarily be an element of optical lens assembly 100.

Figure 1B:
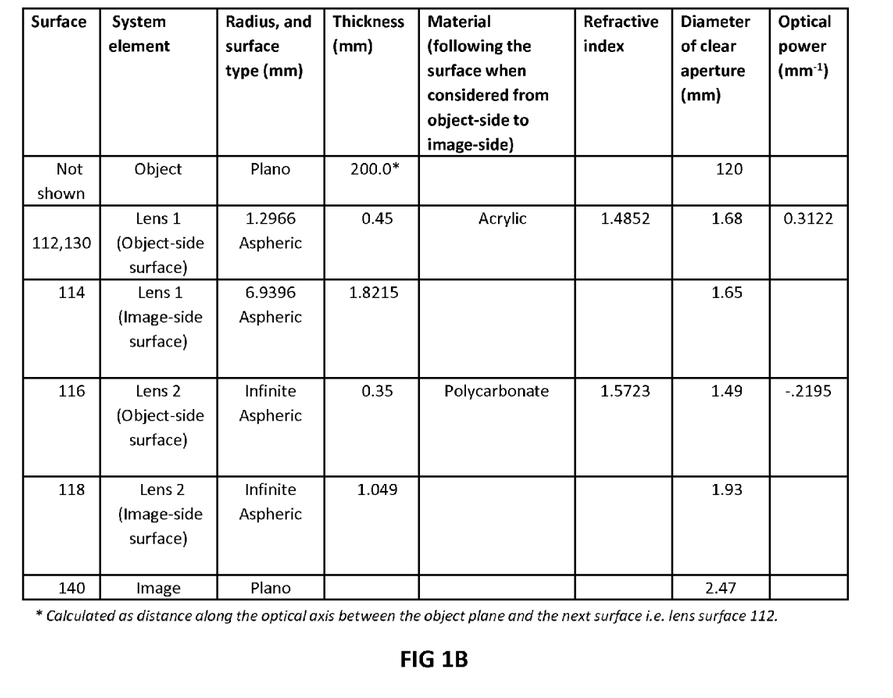
FIG. 1B illustrates detailed optical data of the first embodiment of the optical assembly.
Figure 1C:
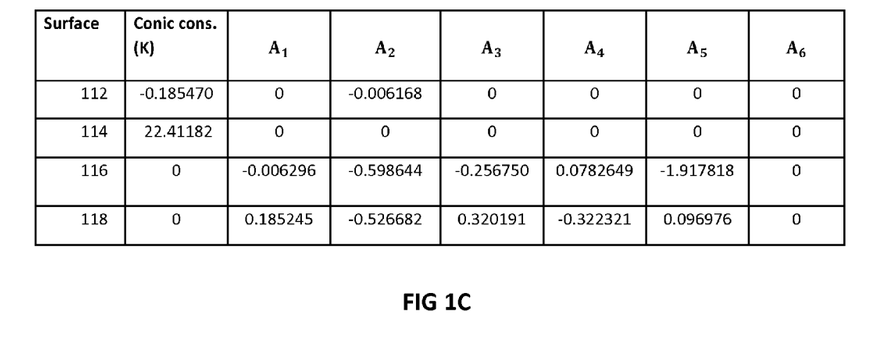
FIG. 1C provides aspheric surface profile data of the first embodiment of the optical assembly.

FIG. 1B illustrates detailed optical data of optical lens assembly 100 that is configured to conform to constraints 1 to 5 discussed hereinabove. FIG. 1C shows aspheric surface profile data of optical assembly lens assembly 100, which aspheric surface profile data derived based on Expression (1) above.

Figure 1D:
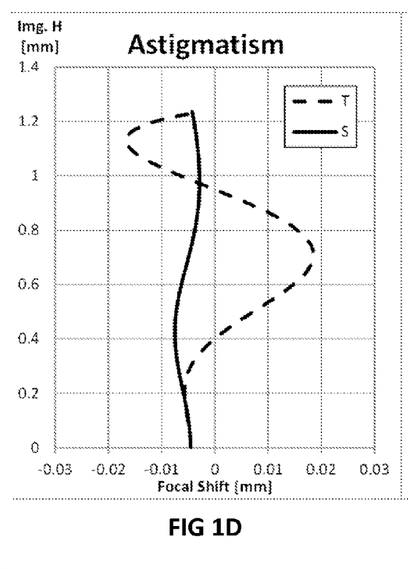
FIGS. 1D, 1E and 1F respectively illustrate astigmatism curves, the distortion curve and the modulation transfer function, of the first embodiment of the optical lens assembly.
Figure 1E:
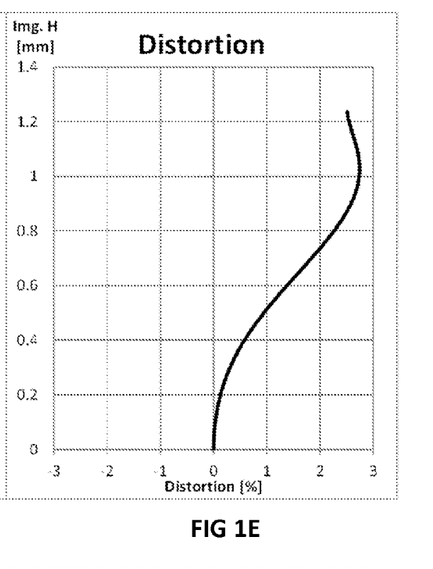
Figure 1F:
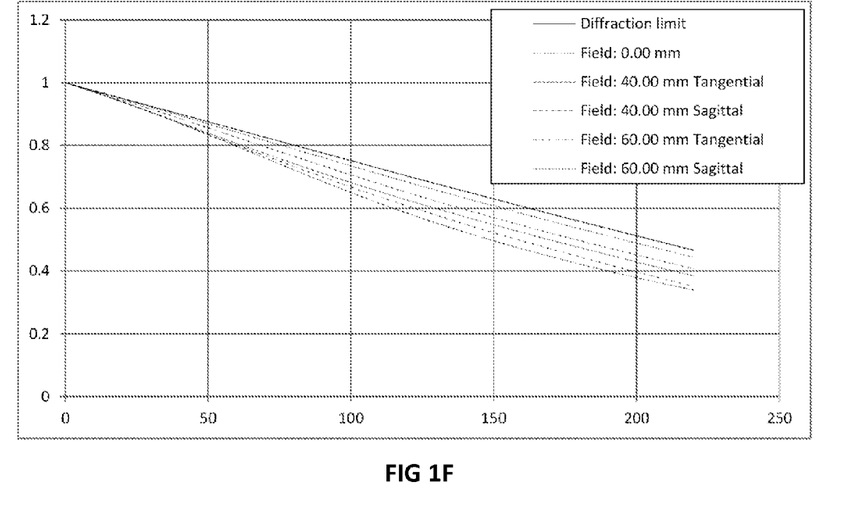

FIGS. 1D, 1E and 1F respectively illustrate astigmatism curves, the distortion curve and the modulation transfer function, of the optical lens assembly 100.

The data for optical lens assembly 100 was modeled based on (i) effective focal length f of the entire lens assembly, such that f=3.9 mm, (ii) focal number F/2.4 and (iii) field of view FOV, where FOV=35°; and (iv) the range of wavelengths for illumination was between 780 nm to 840 nm. The specific constraints of the modeled optical lens assembly were:
f/f1=1.21;
f/f2=−0.85;
Ta/f=0.67;
T=3.67;
T/f=0.94;
R1/f=0.33;
K1=0.18547;
R2/f=1.78;
K2=22.411;

Data in FIGS. 1D, 1E and 1F establishes that the first embodiment of the invention achieves (i) diffraction limited image quality for apertures (i.e. input pupil diameters) having a focal number of F/2.4 and angular field of view in the object space of 35 degrees (ii) Modulation transfer function MTF>60% at 110 lp/mm (line pairs/millimeter) and (iii) low geometrical distortion, at less than 3%.

Figure 2A:
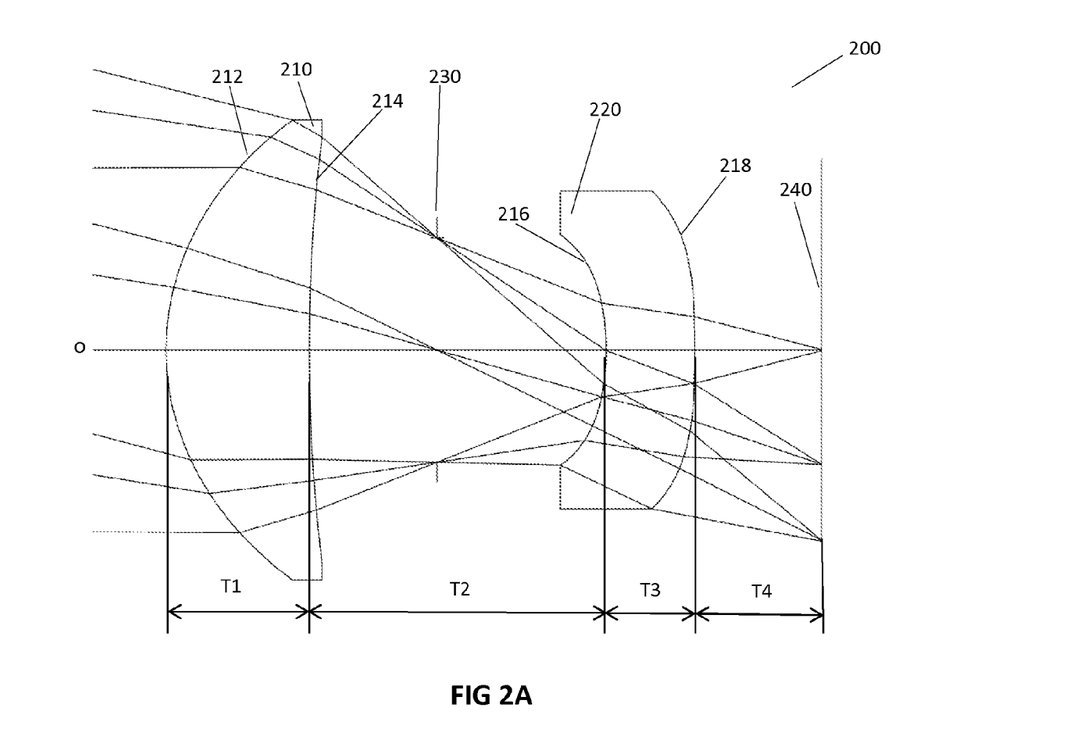
FIG. 2A illustrates an optical assembly in accordance with a second embodiment of the invention.

FIG. 2A illustrates an optical lens assembly 200 in accordance with a second embodiment of the present invention. The optical lens assembly 200 comprises two lens elements, in order from the object side to the image side: a first plastic lens element 210 having a first refractive index, a second plastic lens element 220 having a second refractive index, and an aperture stop 230 disposed between first lens element 210 and second lens element 220. First lens element 210 comprises a positive meniscus lens having a convex object-side surface 212 and a concave image-side surface 214. Second lens element 220 comprises a meniscus lens element, having a aspherical object-side surface 216 and an aspherical image-side surface 218. In the illustrated embodiment, second lens element 220 has a negative optical power, and the first refractive index is lower than the second refractive index.

Thickness of first lens element 210 at optical axis o of optical lens assembly 200 is T1. The distance between the image-side surface 214 of the first lens element 210 and the object-side surface 216 of the second lens element 220 along the optical axis o is T2. Thickness of the second lens element 220 at the optical axis o is T3. The distance between image-side surface of second lens element 220 and an image surface 240 is T4. The total thickness of the optical lens assembly along the optical axis o is Ta (i.e. T1+T2+T3). The total distance between the object-size surface of the first lens element 210 and the image surface 240, measured along the optical axis o is T (i.e. T1+T2+T3+T4). It would be understood that while image surface 240 is illustrated in FIG. 2A, it may not be understood as an essential element of optical lens assembly 200.

Figure 2B:
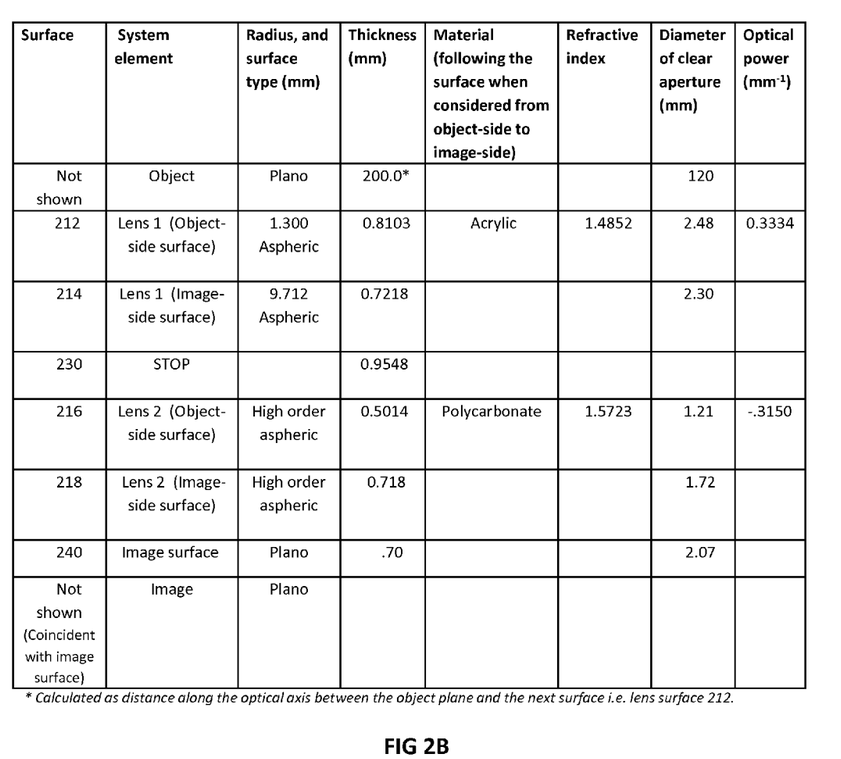
FIG. 2B illustrates detailed optical data of the second embodiment of the optical assembly.
Figure 2C:
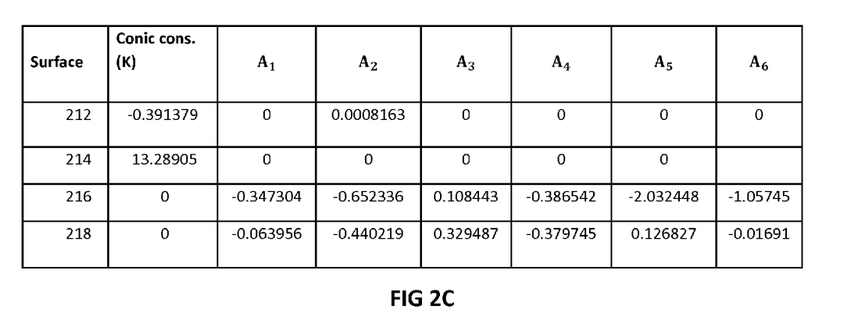
FIG. 2C provides aspheric surface profile data of the second embodiment of the optical assembly.

FIG. 2B illustrates detailed optical data of optical lens assembly 200 configured to conform to constraints 1 to 5 discussed hereinabove. FIG. 2C shows aspheric surface profile data of optical assembly lens assembly 200, which aspheric surface profile data has been derived based on Expression (1) above.

Figure 2D:
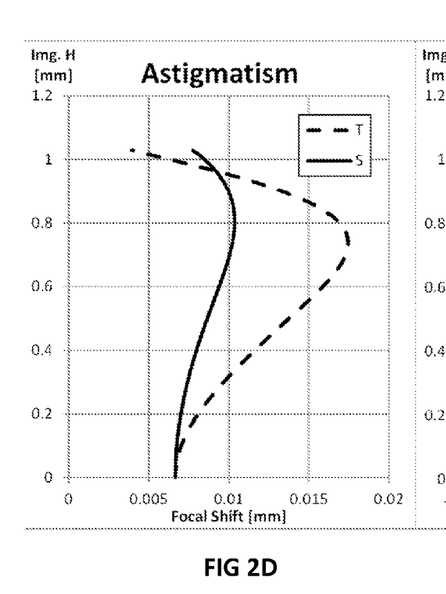
FIGS. 2D, 2E and 2F respectively illustrate astigmatism curves, the distortion curve and the modulation transfer function, of the second embodiment of the optical lens assembly.
Figure 2E:
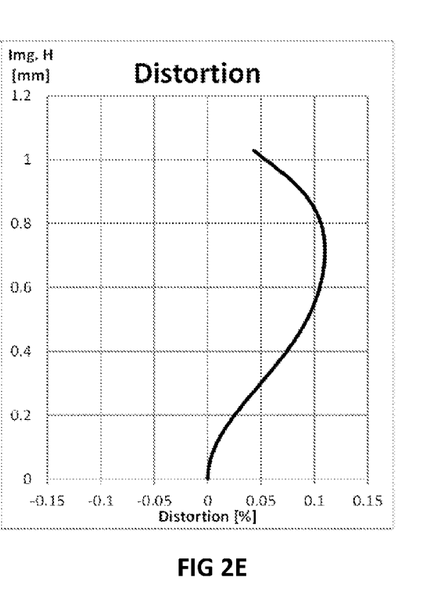
Figure 2F:
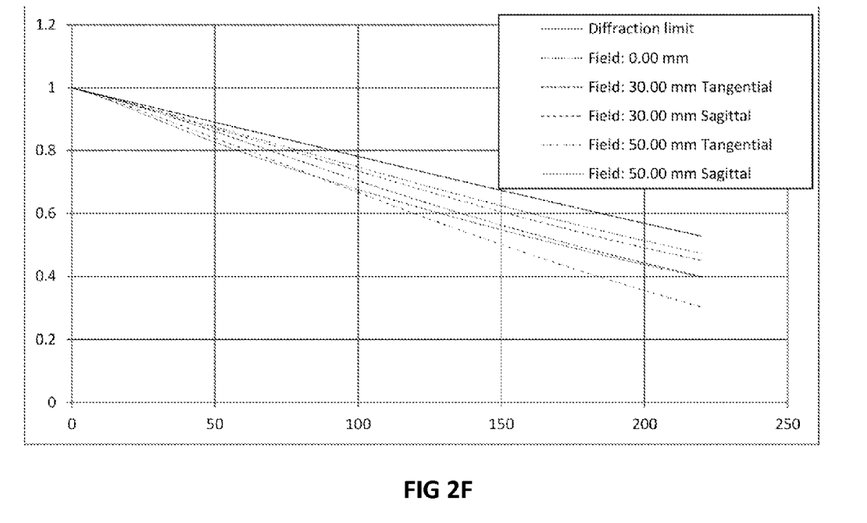

FIGS. 2D, 2E and 2F respectively illustrate the astigmatism curves, the distortion curves and the change in modulation transfer function corresponding to spatial frequency, of the optical lens assembly 200.

The data for optical lens assembly 200 was modeled based on (i) effective focal length f of the entire lens assembly, where f=4.0, (ii) focal number F/2.1 (iii) field of view FOV, where FOV=30°; and (iv) the primary wavelength of illumination was 810 nm. The specific constraints of the modeled optical lens assembly were:

f/f1=1.33;
f/f2=−1.26;
Ta/f=0.75;
T=3.706;
T/f=0.93;
R1/f=0.32;
K1=−0.3914;
R2/f=2.43;
K2=13.2890;

Data in FIGS. 2D, 2E and 2F establish that the second embodiment of the invention achieves (i) diffraction limited image quality for apertures (i.e. input pupil diameters) having a focal number of less than F/2.1 and angular field of view in the object space of less than 30 degrees (ii) Modulation transfer function MTF>60% at 110 lp/mm (line pairs/millimeter) and (iii) low geometrical distortion, at less than 0.11%.

Figure 3A:
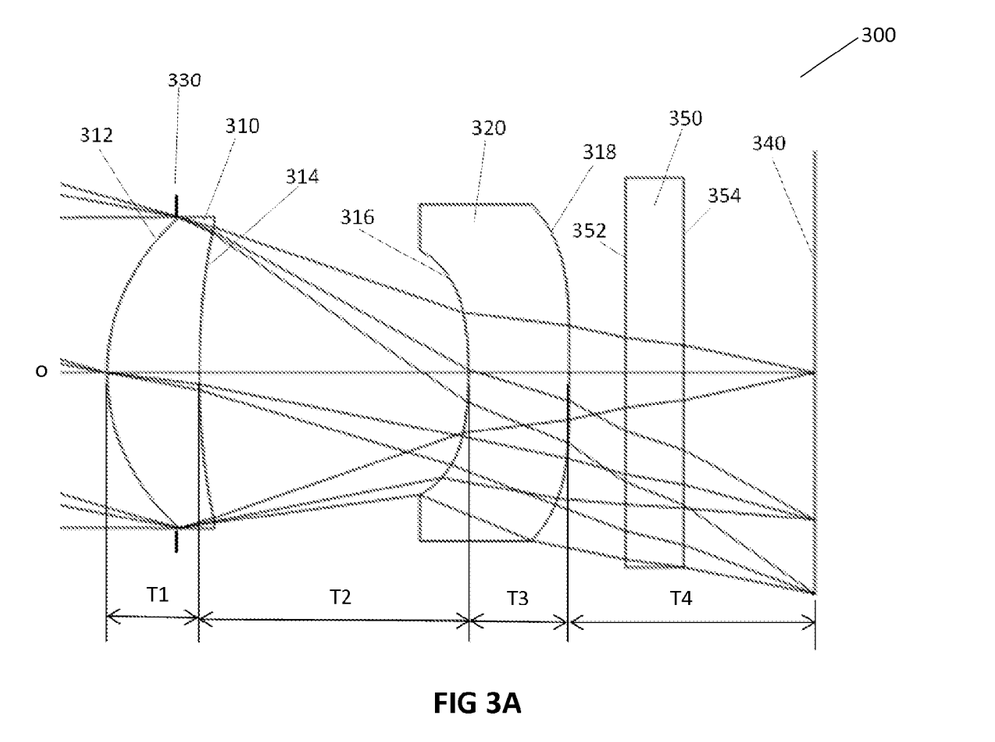
FIG. 3A illustrates an optical assembly in accordance with a third embodiment of the invention.

FIG. 3A illustrates an optical lens assembly 300 in accordance with a third embodiment of the present invention. The optical lens assembly 300 comprises two lens elements, in order from the object side to the image side: a first plastic lens element 310 having a first refractive index, a second plastic lens element 320 having a second refractive index, and an aperture stop 130 disposed on the object-side surface of the first lens element 310. First lens element 310 comprises a positive meniscus lens having a convex object-side surface 312 and a concave image-side surface 314. Second lens element 320 comprises a lens element, having a object-side surface 316 and an aspherical image-side surface 318. In the illustrated embodiment, second lens element 320 has a negative optical power, and the first refractive index is lower than the second refractive index. In the illustrated embodiment, a plano-parallel filter 350 is interposed between second lens element 320 and image surface 340, having object-side surface 352 and image-side surface 354.

Thickness of first lens element 310 at optical axis o of optical lens assembly 300 is T1. The distance between the image-side surface 314 of the first lens element 310 and the object-side surface 316 of the second lens element 320 along the optical axis o is T2. Thickness of the second lens element 320 at the optical axis o is T3. The distance between image-side surface of second lens element 320 and an image surface 340 is T4. The total thickness of the optical lens assembly along the optical axis o is Ta (i.e. T1+T2+T3). The total distance between the object-size surface of the first lens element 310 and the image surface 340, measured along the optical axis o is T (i.e. T1+T2+T3+T4). It would be understood that while image surface 340 is illustrated in FIG. 3A, it may not be understood as an essential element of optical lens assembly 300.

Figure 3B:
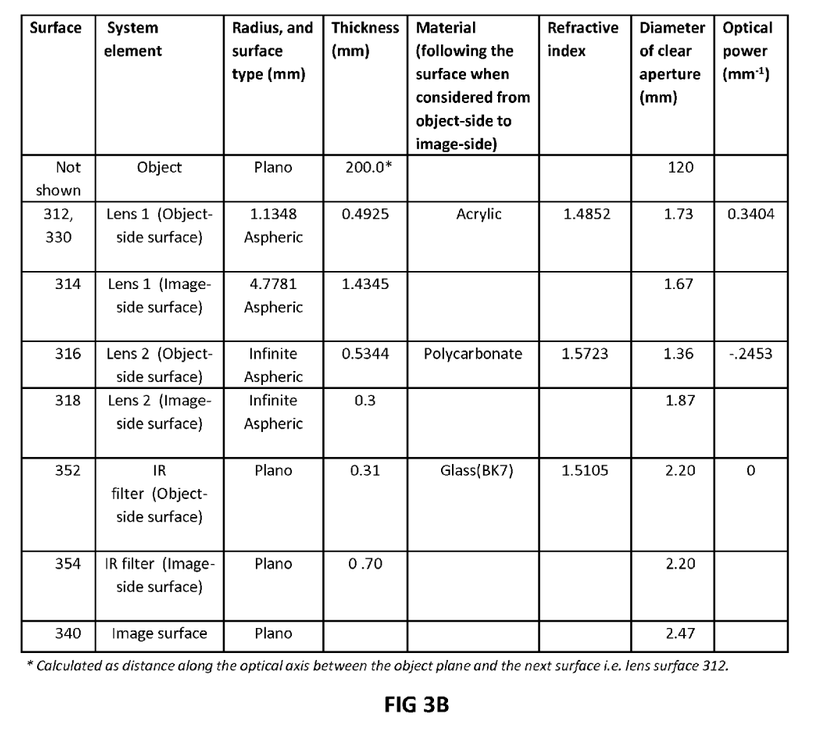
FIG. 3B illustrates detailed optical data of the third embodiment of the optical assembly.
Figure 3C:
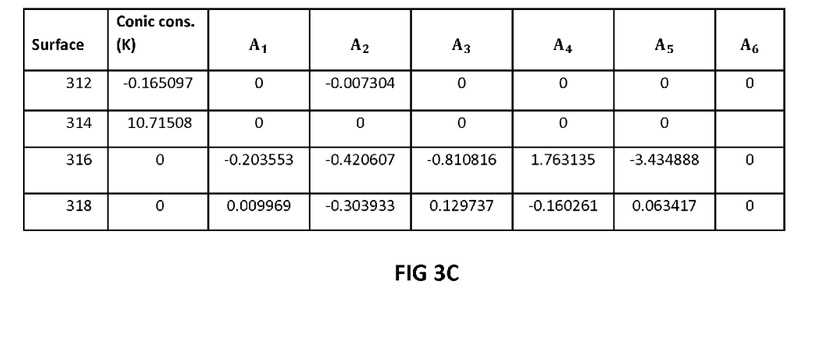
FIG. 3C provides aspheric surface profile data of the third embodiment of the optical assembly.

FIG. 3B illustrates detailed optical data of optical lens assembly 300 configured to conform to constraints 1 to 5 discussed hereinabove. FIG. 3C shows aspheric surface profile data of optical assembly lens assembly 300, which aspheric surface profile data has been derived based on Expression (1) above.

Figure 3D:
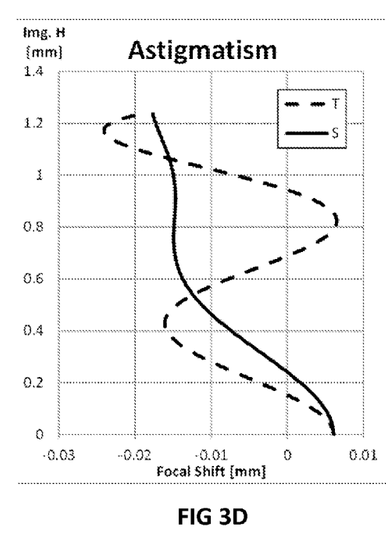
FIGS. 3D, 3E and 3F respectively illustrate astigmatism curves, the distortion curve and the modulation transfer function, of the first embodiment of the optical lens assembly.
Figure 3E:
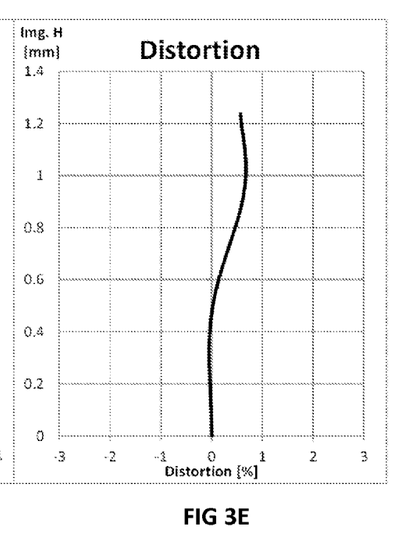
Figure 3F:
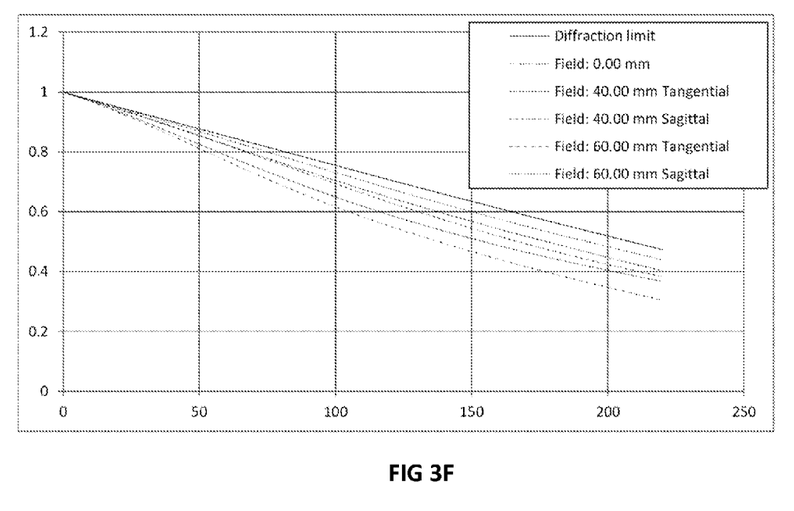

FIGS. 3D, 3E and 3F respectively illustrate the astigmatism curves, the distortion curves and the change in modulation transfer function corresponding to spatial frequency, of the optical lens assembly 300.

The data for optical lens assembly 300 was modeled based on (i) effective focal length f of the entire lens assembly, where f=4.0, (ii) focal number F/2.35 (iii) field of view FOV, where FOV=35°; and (iv) the primary wavelength of illumination was 810 nm. The specific constraints of the modeled optical lens assembly were:

f/f1=1.35;
f/f2=−0.98;
Ta/f=0.61;
T=3.771;
T/f=0.94;
R1/f=0.28;
K1=−0.1651;
R2/f=1.19;
K2=10.7151;

Data in FIGS. 3D, 3E and 3F establish that the second embodiment of the invention achieves (i) diffraction limited image quality for apertures (i.e. input pupil diameters) having a focal number of less than F/2.35 and angular field of view in the object space of less than 35 degrees (ii) Modulation transfer function MTF>60% at 110 lp/mm (line pairs/millimeter) and (iii) low geometrical distortion, at less than 1%, including with addition of plano-parallel optical elements within the optical lens assembly.

Figure 4A:
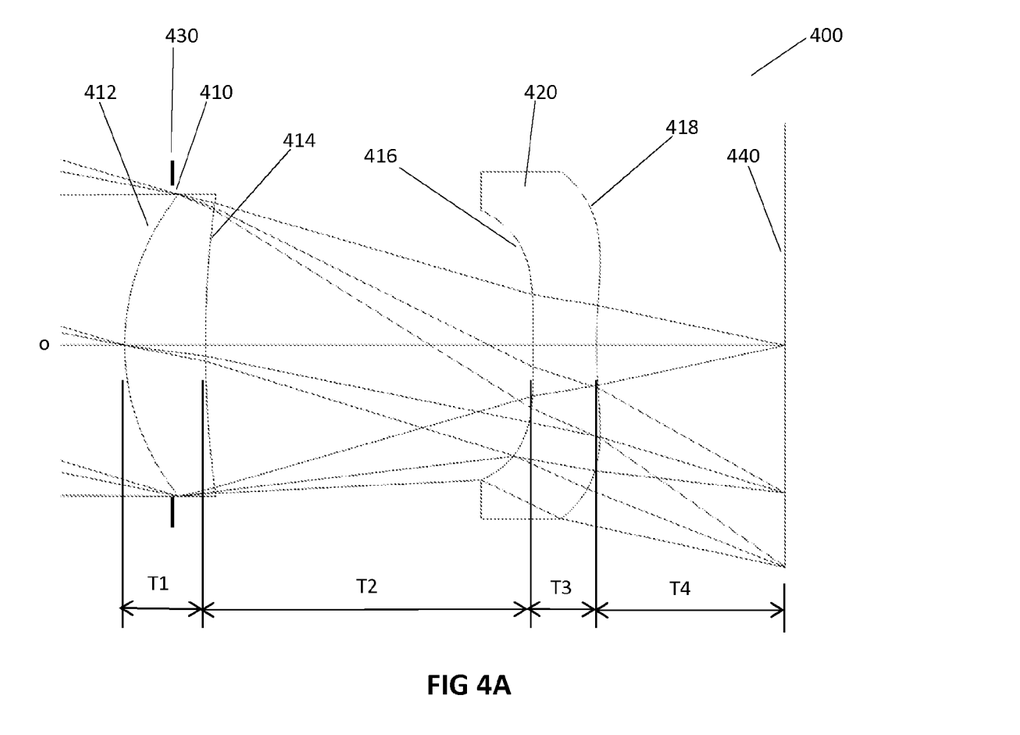
FIG. 4A illustrates an optical assembly in accordance with a fourth embodiment of the invention.

FIG. 4A illustrates an optical lens assembly 400 in accordance with a fourth embodiment of the present invention. The optical lens assembly 400 comprises two lens elements, in order from the object side to the image side: a first acrylic lens element 410 having a first refractive index, a second acrylic lens element 420 having a second refractive index, and an aperture stop 430 disposed on the object-side surface of the first lens element. First lens element 410 comprises a positive meniscus lens having a convex object-side surface 412 and a concave image-side surface 414. Second lens element 420 comprises a negative lens element, having an aspherical object-side surface 416 and an aspherical image-side surface 418. In the illustrated embodiment, second lens element 420 has a negative optical power, and the first refractive index identical to the second refractive index.

Thickness of first lens element 410 at optical axis o of optical lens assembly 100 is T1. The distance between the image-side surface 414 of the first lens element 410 and the object-side surface 416 of the second lens element 420 along the optical axis o is T2. Thickness of the second lens element 420 at the optical axis o is T3. The distance between image-side surface of second lens element and an image surface 440 is T4. The total thickness of the optical lens assembly along the optical axis o is Ta (i.e. T1+T2+T3). The total distance between the object-side surface of the first lens element 410 and the image surface 440, measured along the optical axis o is T (i.e. T1+T2+T3+T4). It would be understood that while image surface 440 is illustrated in FIG. 4A, it may not necessarily be an element of optical lens assembly 400.

Figure 4B:
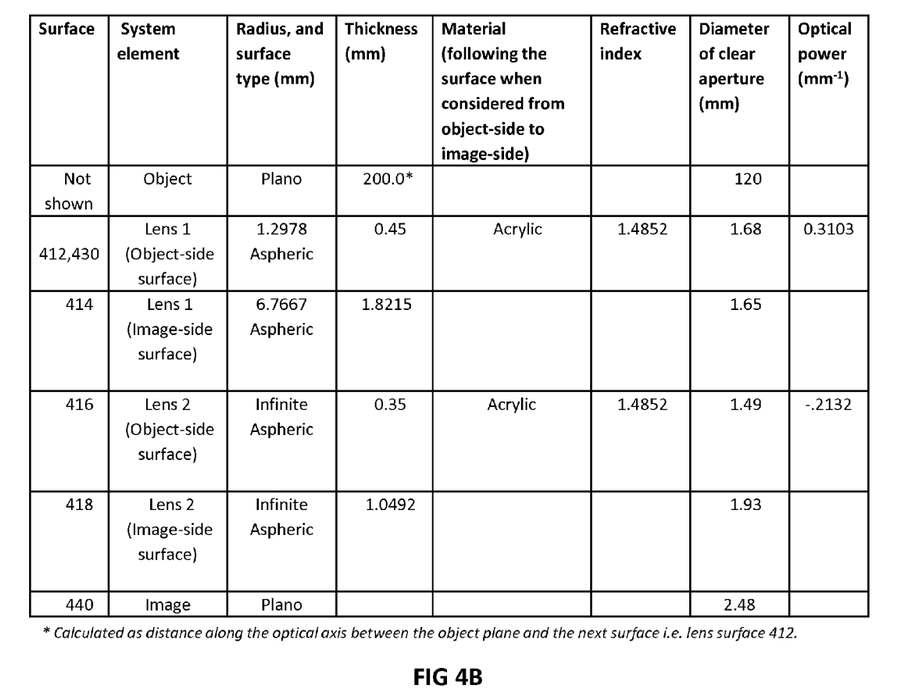
FIG. 4B illustrates detailed optical data of the fourth embodiment of the optical assembly.
Figure 4C:
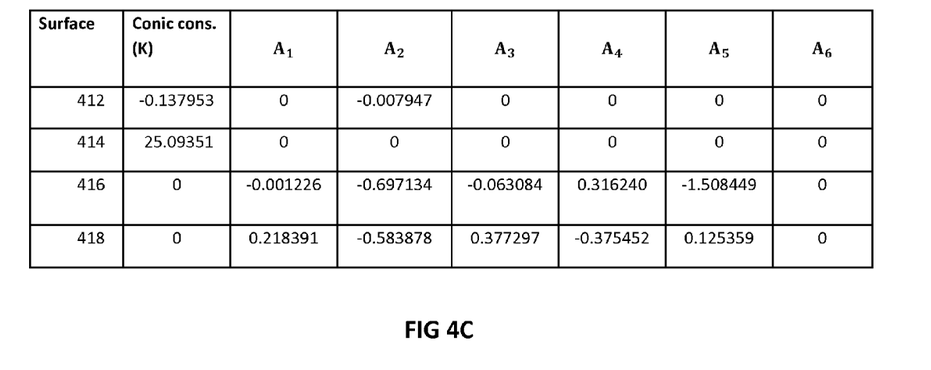
FIG. 4C provides aspheric surface profile data of the fourth embodiment of the optical assembly.

FIG. 4B illustrates detailed optical data of optical lens assembly 400 that is configured to conform to constraints 1 to 5 discussed hereinabove. FIG. 4C shows aspheric surface profile data of optical assembly lens assembly 400, which aspheric surface profile data derived based on Expression (1) above.

Figure 4D:
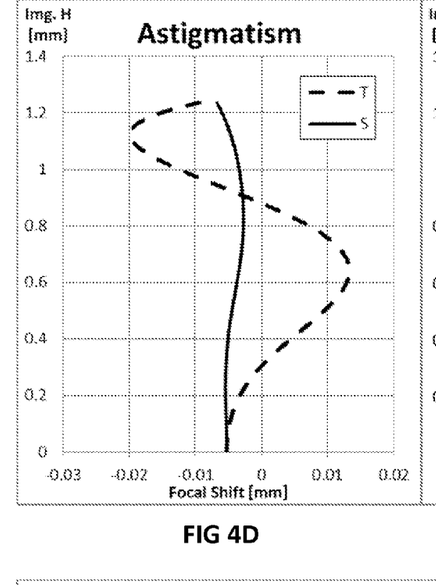
FIGS. 4D, 4E and 4F respectively illustrate astigmatism curves, the distortion curve and the modulation transfer function, of the fourth embodiment of the optical lens assembly.
Figure 4E:
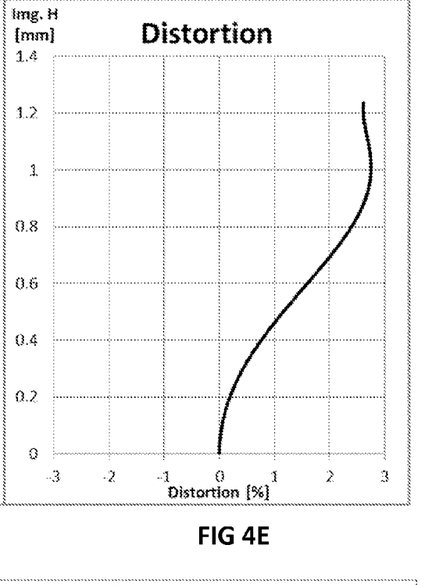
Figure 4F:
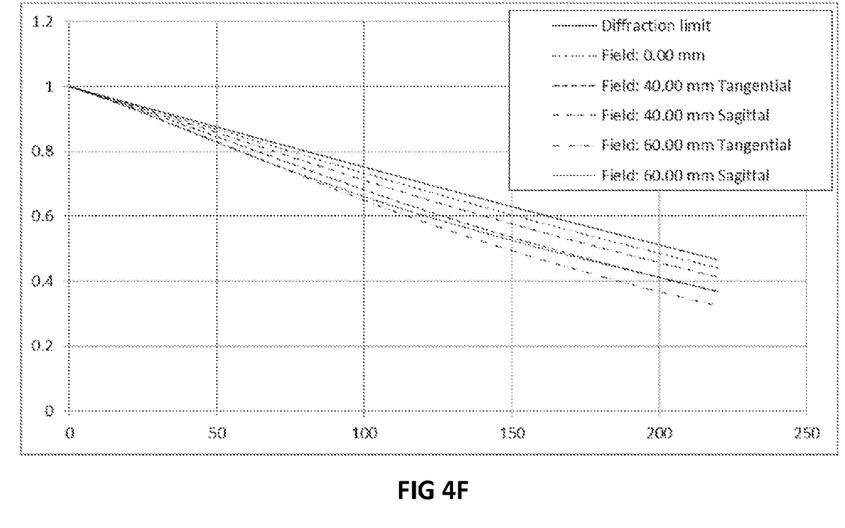

FIGS. 4D, 4E and 4F respectively illustrate astigmatism curves, the distortion curve and the modulation transfer function, of the optical lens assembly 400.

The data for optical lens assembly 400 was modeled based on (i) effective focal length f of the entire lens assembly, such that f=3.9 mm, (ii) focal number F/2.4 and (iii) field of view FOV, where FOV=35°; and (iv) the range of wavelengths for illumination was between 780 nm to 840 nm. The specific constraints of the modeled optical lens assembly were:

$f/f1=1.21$;
$f/f2=-0.83$;
$Ta/f=0.67$;
$T=3.67$;
$T/f=0.94$;
$R1/f=0.33$;
$K1=-0.1380$;
$R2/f=1.74$;
$K2=25.0935$;

Data in FIGS. 4D, 4E and 4F establishes that the fourth embodiment of the invention achieves (i) diffraction limited image quality for apertures (i.e. input pupil diameters) having a focal number of F/2.4 and angular field of view in the object space of 35 degrees (ii) Modulation transfer function MTF>60% at 110 lp/mm (line pairs/millimeter) and (iii) low geometrical distortion, at less than 3%.

The invention accordingly provides for compact optical lens assemblies for optical imaging, including within portable electronic devices. By implementing aspherical lens elements within an optical lens assembly, the invention additionally enables lens assemblies capable of being manufactured or mass produced using conventional injection-molding techniques, with consequent time, cost and labor efficiencies.

The invention may additionally include an optical imaging apparatus comprising the optical lens assembly as described in any of the embodiments above, and an image sensor. The image sensor in the optical imaging apparatus provides an image surface. In embodiments of the optical imaging apparatus, position of the image sensor relative to the optical lens assembly coincides with positions of the image surface discussed hereinabove in embodiments of the optical lens assembly (see for example, image surfaces 140, 240 and 340).

The optical lens assembly within the optical imaging apparatus may be configured for imaging onto the image sensor, an object located a finite distance away from the object-side surface of the first lens element, or alternatively at optical infinity.

The optical imaging apparatus may additionally comprise an illumination source configured for illuminating an object plane (and accordingly an object positioned at the object plane) for image capture. In an embodiment, the source of illumination may include a light emitting diode (LED). In an embodiment, the illumination source may be selected so as to emit wavelengths only within an optical spectral bandwidth in the region of 160 nm or less. In a more specific embodiment, the illumination source may be selected so as to emit wavelengths only within an optical spectral bandwidth in the region of 160 nm or less, within the near IR spectrum. In a yet more specific embodiment, the illumination source may be selected so as to emit wavelengths only within an optical spectral bandwidth of approximately 160 nm or less, and wherein the optical spectral bandwidth includes 810 nm wavelengths. In an embodiment of the optical imaging apparatus, the illumination source may comprise a single peak LED configured to emit wavelengths within the optical spectral bandwidths as discussed above. In another embodiment, the illumination source may comprise two single peak wavelength LEDs respectively configured to emit wavelengths in the region of 760 nm and 850 nm. In a further embodiment, the illumination source may comprise a single peak LED configured to emit wavelengths in the region of 850 nm. In an alternative embodiment, the illumination source may comprise an LED configured to emit wavelengths between 940 nm to 960 nm.

In specific embodiments of the invention, the optical imaging apparatus may be implemented within portable electronic devices, mobile computing devices or mobile communication devices, including without limitation mobile phones, smart phones, personal digital assistants, tablets, laptops or other handheld communication devices, bar code readers and web cameras. The compact optical lens assembly causes the present invention to be particularly suitable for devices having narrow depth profiles. In a particular embodiment, an optical imaging apparatus in accordance with the present invention may be disposed within a device housing having an external surface (such as a front surface of a mobile phone, laptop or tablet). In a preferred embodiment, the external surface of the device housing may be optically clear (or transparent) or substantially optically clear (or substantially transparent).

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. An optical imaging lens assembly comprising, in order from an object-side to an image side:
   a first aspherical positive lens element comprising an object-side surface and an image-side surface; and
   a second aspherical negative lens element comprising an object-side surface and an image-side surface;
   wherein elements of the optical imaging lens assembly are configured to satisfy the relations:
   $T<1.2f$;
   $1.1<f/f1<1.5$;
   $-1.5<f/f2<-0.6$;
   $0.2<R1/f<0.5$; and
   $-0.25<K1<-0.05$;
   and wherein f is focal length of the optical imaging lens assembly, f1 is focal length of the first lens element, f2 is focal length of the second lens element, R1 is radius of curvature on the object-side surface of the first lens element, K1 is conic of the object-side surface of the first lens element, T1 is thickness of the first lens element, T2 is distance between the image-side surface of the first lens element and the object-side surface of the second lens element, T3 is thickness of the second lens element, T4 is distance between the image-side surface of the second lens element and an image surface, and T is total track length of the optical lens assembly such that $T=T1+T2+T3+T4$;
   and wherein T1, T2, T3 and T4 are distances measured between points of intersection of respective lens surfaces and optical axis of the optical lens assembly.

2. The optical imaging lens assembly as claimed in claim 1, wherein elements of the optical imaging lens assembly are configured to satisfy one or more of the following relations:
0.4<Ta/f<0.8;
0.5<R2/f<100; and
2.5<K2<50;
and wherein R2 is radius of curvature on the image-side surface of the first lens element, K2 is conic of the image-side surface of the first lens element, and Ta is total thickness of the optical lens assembly, such that Ta=T1+T2+T3.

3. The optical imaging lens assembly as claimed in claim 1, comprising an aperture stop disposed between an object plane and an imaging surface.

4. The optical imaging lens assembly as claimed in claim 3, wherein the aperture stop may be disposed between the object plane and the first lens element, or on the object-side surface of the first lens element, or on the image-side surface of the first lens element, or between the first and the second lens elements, or within the first lens element.

5. The optical imaging lens assembly as claimed in claim 1, comprising at least one plano-parallel lens element disposed between the first lens element and the object plane, or between the first lens element and the second lens element, or between the second lens element and the image surface.

6. An optical imaging apparatus comprising:
an image sensor; and
an optical imaging lens assembly comprising, in order from an object-side to an image side:
a first aspherical positive lens element comprising an object-side surface and an image-side surface; and
a second aspherical negative lens element comprising an object-side surface and an image-side surface;
wherein elements of the optical imaging lens assembly are configured to satisfy the relations:
T<1.2f;
1.1<f/f1<1.5;
−1.5<f/f2<−0.6;
0.2<R1/f<0.5; and
−0.25<K1<−0.05;
and wherein f is focal length of the optical imaging lens assembly, f1 is focal length of the first lens element, f2 is focal length of the second lens element, R1 is radius of curvature on the object-side surface of the first lens element, K1 is conic of the object-side surface of the first lens element, T1 is thickness of the first lens element, T2 is distance between the image-side surface of the first lens element and the object-side surface of the second lens element, T3 is thickness of the second lens element, T4 is distance between the image-side surface of the second lens element and an image surface disposed on the image sensor, and T is total track length of the optical lens assembly such that T=T1+T2+T3+T4.

7. The optical imaging apparatus as claimed in claim 6, wherein elements of the optical imaging lens assembly are configured to satisfy one or more of the following relations:
0.4<Ta/f<0.8;
0.5<R2/f<100; and
2.5<K2<50;
and wherein R2 is radius of curvature on the image-side surface of the first lens element, K2 is conic of the image-side surface of the first lens element, and Ta is total thickness of the optical lens assembly, such that Ta=T1+T2+T3.

8. The optical imaging apparatus as claimed in claim 6, comprising an illumination source configured for illuminating an object plane, for image capture.

9. The optical imaging apparatus as claimed in claim 8, wherein the source of illumination comprises one or more light emitting diodes configured to emit wavelengths within a spectral bandwidth of upto 160 nm within the near infra red spectrum.

10. The optical imaging apparatus as claimed in claim 9, wherein the spectral bandwidth includes wavelengths of 800 nm.

11. The optical imaging apparatus as claimed in claim 9, wherein the illumination source comprises first and second single peak wavelength light emitting diodes, wherein the first light emitting diode emits wavelengths within a first spectral bandwidth that includes wavelengths of 760 nm and the second light emitting diode emits wavelengths within a second spectral bandwidth that includes wavelengths of 850 nm.

* * * * *